United States Patent [19]

von der Heide

[11] 4,367,855
[45] Jan. 11, 1983

[54] APPARATUS FOR THE EXCISION AND REMOVAL OF BLOCKS OF SILAGE

[76] Inventor: Hans von der Heide, Ibbenbürener Str. 17, 4533 Laggenbeck, Fed. Rep. of Germany

[21] Appl. No.: 234,528

[22] Filed: Feb. 17, 1981

[30] Foreign Application Priority Data

Feb. 23, 1980 [DE] Fed. Rep. of Germany ....... 3006881

[51] Int. Cl.³ .............................................. B02C 18/02
[52] U.S. Cl. ................................. 241/283; 241/101.7; 241/235
[58] Field of Search .......... 83/928; 241/101 A, 101.7, 241/283, 235

[56] References Cited

U.S. PATENT DOCUMENTS 4,058,038 11/1977 Tenhunen ........................ 83/928 X

FOREIGN PATENT DOCUMENTS 2357723 8/1974 Fed. Rep. of Germany ... 241/101.7
2408822 9/1974 Fed. Rep. of Germany ... 241/101.7

Primary Examiner—Mark Rosenbaum
Attorney, Agent, or Firm—Felfe & Lynch

[57] ABSTRACT

An apparatus for the excision and removal of blocks from a stock of silage, having a frame to which prongs are fastened parallel to one another and a knife which is fastened to a support which can be driven as a carriage on a U-shaped track at a distance above the plane formed by the prongs corresponding approximately to the length of the knife. Behind the prongs, a feed container is disposed whose front side is open, whose rear wall is in the form of a scraper flight conveyor, and which has a lateral opening for dispensing the feed. The entire apparatus can be pivoted about 90 degrees after a block of feed has been excised, so that then the scraper flight conveyor forms the bottom side of the feed container.

3 Claims, 4 Drawing Figures

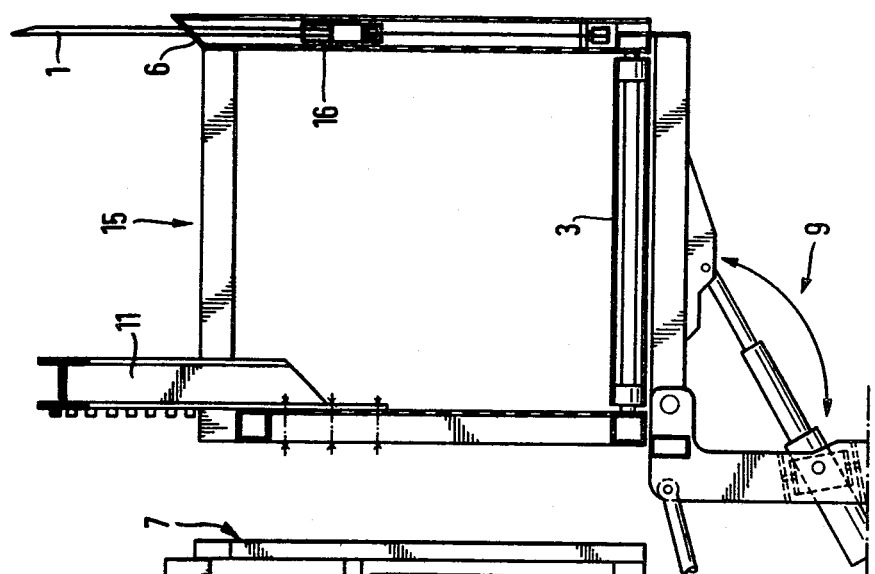
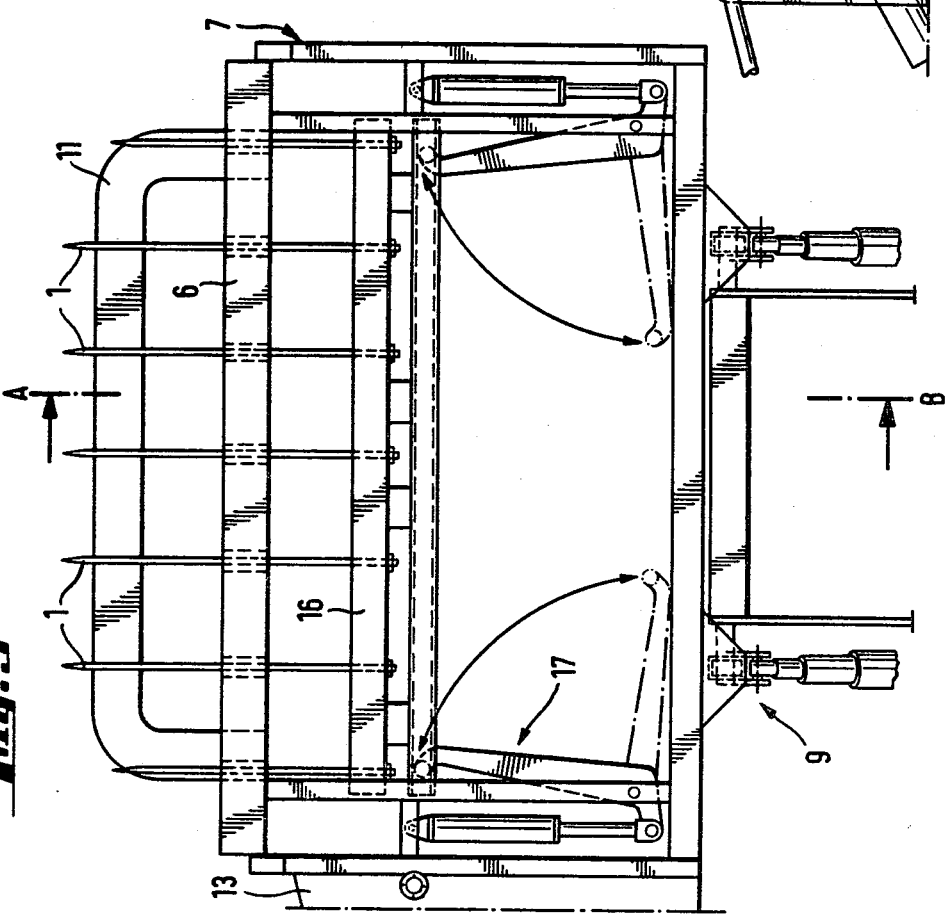

APPARATUS FOR THE EXCISION AND REMOVAL OF BLOCKS OF SILAGE

BACKGROUND

The invention relates to an apparatus for the excision and removal of blocks from a stock of silage, having a frame to which prongs are fastened parallel to one another, and a knife which is fastened to a cutting mechanism which can be driven as a carriage along a U-shaped track at a distance corresponding approximately to the length of the knife above a plane formed by the prongs.

Such an apparatus has been disclosed in German Pat. No. 2,307,689. With this known apparatus, the block of feed is taken from the silage stock, carried through a cow stable and set down in front of the feed troughs. The distribution of the feed to the individual troughs is then performed by hand. This entails a great amount of manual labor.

It is the object of the invention to eliminate this disadvantage of the state of the art and to create an apparatus of the kind described above whereby the feed can be distributed without manual labor after the removal of the block of silage.

This object is achieved in accordance with the invention in an apparatus of the kind described above in that behind the prongs a silage box is disposed whose front side is open and whose rear side is in the form of a scraper flight conveyor, and which has a lateral outfeed opening for the silage, and that the entire apparatus can be tilted back by 90 degrees after the block of feed has been excised, so that then the scraper flight conveyor forms the bottom side of the silage box.

To pull the excised block of silage all the way into the feed box and prevent silage losses during transportation, it is advantageous that a stripper encompassing the prongs be present at the front edge of the feed box, and that the prongs be retractable through the stripper.

The stripper advantageously slopes towards the open side of the feed box.

An embodiment of the invention will be further explained below in conjunction with the drawing, wherein:

BRIEF DESCRIPTION OF THE DRAWINGS

FIG. 3 is a bottom view of the apparatus of FIGS. 1 and 2, and

FIG. 4 is a cross section taken through the apparatus along the line A-B of FIG. 3.

DETAILED DESCRIPTION OF THE INVENTION

Referring now to FIGS. 1-4, the apparatus of the invention will now be described.

Figure 1:
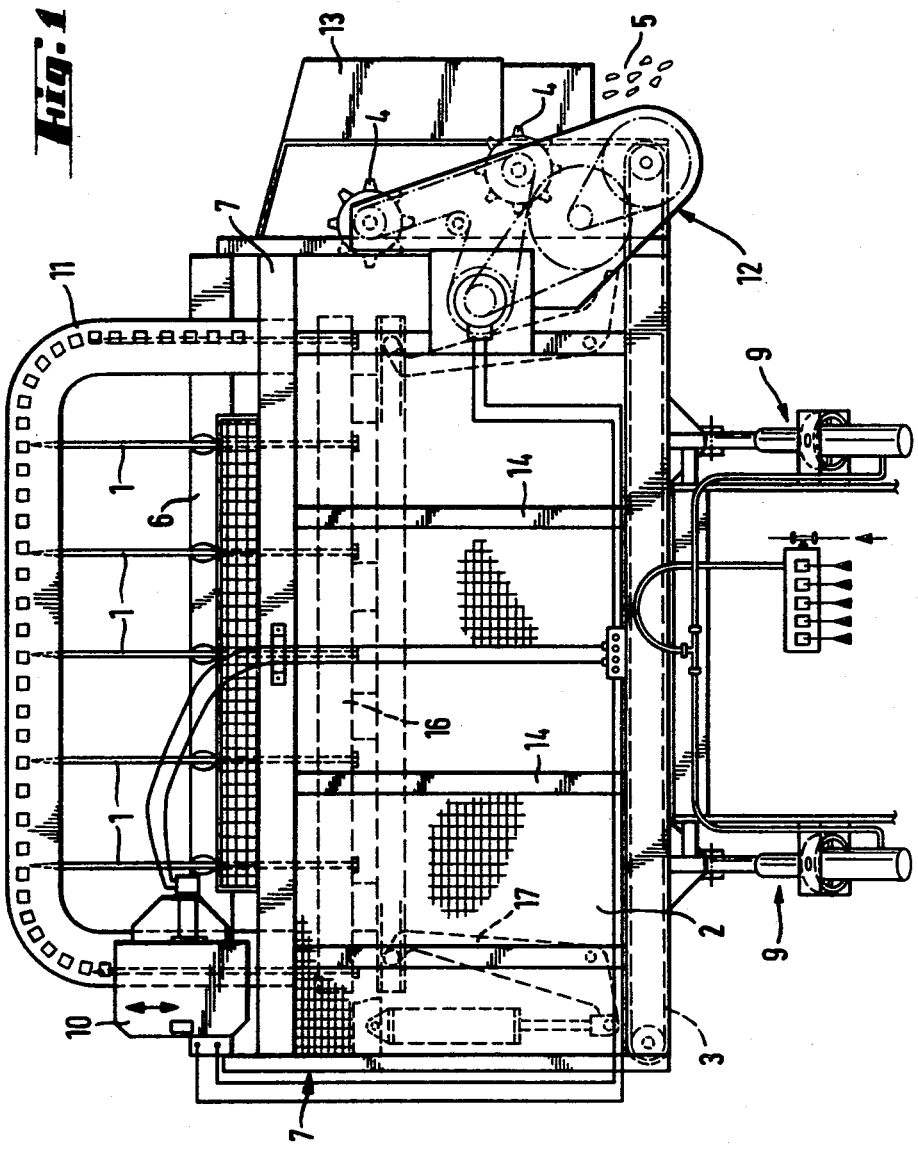
FIG. 1 is a top view of the apparatus of the invention.

FIG. 1 is a top view of the apparatus of the invention as seen in the cutting position, or it is a side view as seen in the dispensing position after the apparatus is tilted back 90 degrees. The apparatus has a frame 7 on which prongs 1 are fastened parallel to one another. On a cutting mechanism 10 there is fastened a knife 8 which by a sawing movement cuts a block out of a stock of silage. The cutting mechanism 10 is able to travel in the manner of a carriage on a U-shaped track 11 at a distance corresponding approximately to the length of the knife 8 above the plane formed by the prongs 1. Behind the prongs 1 there is disposed a silage box 2 whose front side 15 is open and whose rear wall is constructed as a scraper flight conveyor 3. On one side of the silage box 2 two shredders 4 are disposed under a cover 13, and are driven by the transmission 12. The silage box 2 furthermore has an opening 5 for dispensing the silage. A portion of frame 7 is in the form of a stripper 6 encompassing the prongs 1 and it slopes towards the open side 15 of the silage box 2. The butts of the prongs 1 are joined together by a beam 16 which, in conjunction with a tilting mechanism 17 permits the prongs to be plunged into the stock of silage. For the stabilization of the apparatus crossmembers 14 are provided. The apparatus can be tilted back 90 degrees by means of a conventional tilting mechanism 9.

Figure 2:
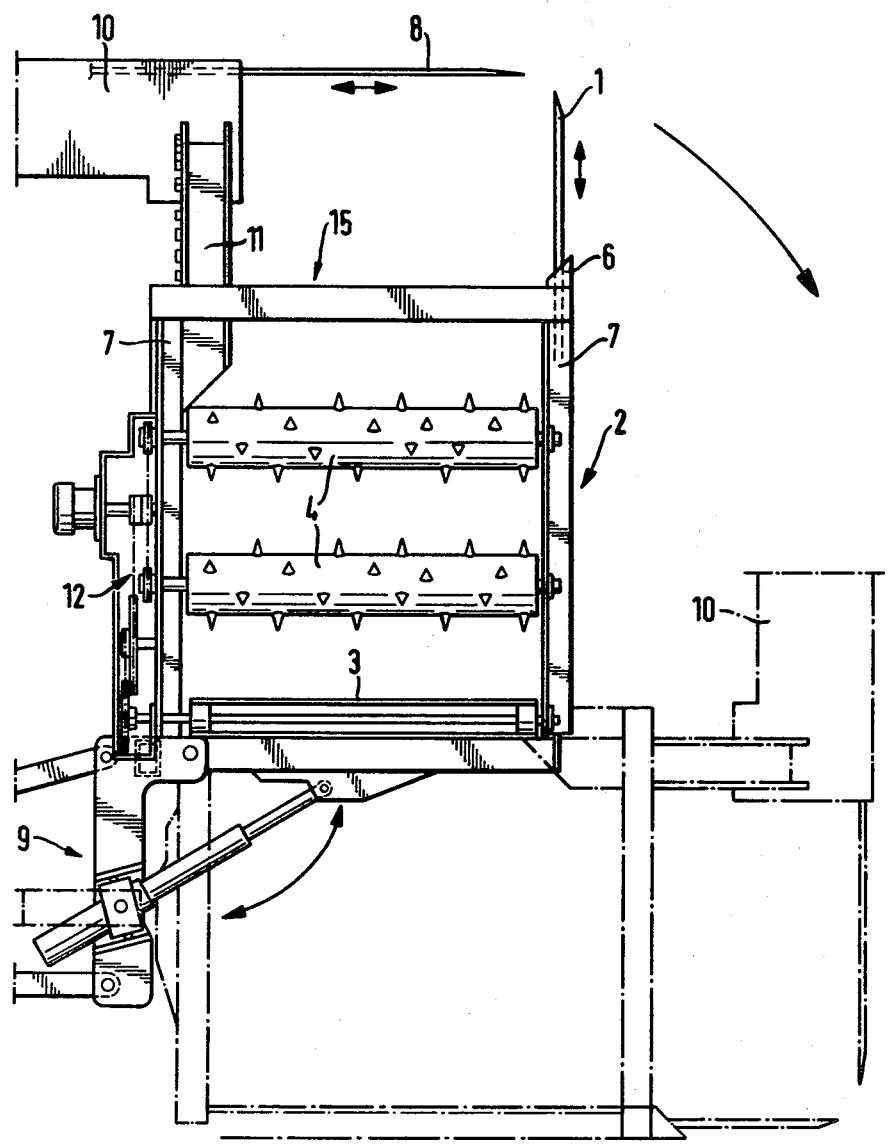
FIG. 2 is a side elevational view of the apparatus of FIG. 1.

In FIG. 2, the drawing represents in solid lines the apparatus in the silage dispensing position, the cover 13 being removed for the sake of clarity. The broken lines in FIG. 2 represent the apparatus in the cutting and extracting position. The entire apparatus is fastened in a known manner to the rear end of a tractor.

The apparatus of the invention now operates as follows: To cut out a block, the tractor moves rearwardly, driving the prongs 1 into the stock of silage, the cutting mechanism 10 is set in operation by the tractor, and the knife 8 is moved through the silage and excises a rectangular block of it. As soon as the cutting mechanism 10 reaches the limit switch tripper, which is not shown, at the other end of the track 11, the cutting mechanism is stopped and reversed for travel in the opposite direction. By means of the tilting mechanism 9, the apparatus is then tilted 90 degrees and the block of silage drops into the silage box 2. The prongs are retracted for the purpose of stripping off any silage residues that may be adhering to them. The tractor now travels into the stable and the silage can be dispensed by operating the scraper flight conveyor and the shredders 4.

The apparatus of the invention makes it possible to cut and remove a block out of a stock of silage, and dispense it without manual labor. It can therefore be considered as an outstanding solution of the problems involved.

What is claimed is:

1. An apparatus for the excision and removal of blocks of silage from a stock of silage, comprising: a frame; prongs fastened to the frame; a knife; means for moving the knife on a U-shaped path at a distance above a plane through the prongs corresponding approximately to the length of the knife; a feed container disposed on the frame behind the prongs and having an open front side, means for forming the rear wall thereof as a scraper flight conveyor, and a lateral opening for dispensing the silage; and means for pivoting the feed container and frame about 90 degrees from a position wherein the open side is vertical to a position wherein the rear wall scraper flight conveyor means forms the bottom of the feed container to effect the input of silage into the feed container and the subsequent output of the silage through the lateral opening.

2. The apparatus of claim 1, further comprising a stripper penetrated by the prongs and disposed at the open front side of the feed container and means for retracting the prongs with respect to the stripper.

3. The apparatus of claim 2, wherein the stripper slopes toward the open front side of the feed container.

* * * * *